(12) United States Patent
Carskadon et al.

(10) Patent No.: US 8,725,301 B2
(45) Date of Patent: May 13, 2014

(54) COMPUTER IMPLEMENTED METHOD FOR CONTROLLING EBB FLOW WATERING SYSTEMS

(75) Inventors: Martin Carskadon, Vancouver, WA (US); Patrick Barrett, Vancouver, WA (US)

(73) Assignee: IP Holdings, LLC, Vancouver, WA (US)

( * ) Notice: Subject to any disclaimer, the term of this patent is extended or adjusted under 35 U.S.C. 154(b) by 377 days.

(21) Appl. No.: 13/200,559

(22) Filed: Sep. 27, 2011

(65) Prior Publication Data

US 2013/0079934 A1    Mar. 28, 2013

(51) Int. Cl.
| | |
|---|---|
| G05D 7/00 | (2006.01) |
| G05D 9/00 | (2006.01) |
| G06F 19/00 | (2011.01) |
| G01F 23/00 | (2006.01) |
| G08B 21/00 | (2006.01) |
| F16K 21/18 | (2006.01) |
| F16K 31/18 | (2006.01) |
| F16K 31/20 | (2006.01) |
| E03B 7/07 | (2006.01) |
| F16K 37/00 | (2006.01) |
| F17D 3/00 | (2006.01) |

(52) U.S. Cl.
USPC ............ 700/282; 700/281; 702/55; 340/623; 4/508; 4/509; 137/41; 137/44; 137/87.02; 137/101.27; 137/115.02; 137/120; 137/122; 137/393; 137/397; 137/398; 137/426; 137/558

(58) Field of Classification Search
USPC .......... 700/11, 17, 275, 281, 282; 702/33, 50, 702/55; 340/500, 540, 603, 612, 618, 623; 4/488, 506–509; 137/38, 40–42, 44, 137/87.01, 87.02, 98, 101.25, 101.27, 109, 137/115.01, 115.02, 118.01, 119.01, 137/120–122, 386, 387, 393, 395–398, 409, 137/426, 551, 558
See application file for complete search history.

(56) References Cited

U.S. PATENT DOCUMENTS

| | | | | | |
|---|---|---|---|---|---|
| 3,975,622 | A | * | 8/1976 | Horn et al. | 700/17 |
| 4,271,861 | A | * | 6/1981 | Crawford | 137/387 |
| 4,279,101 | A | | 7/1981 | Leroux | |
| 4,315,381 | A | | 2/1982 | Dvorin | |
| 4,334,143 | A | * | 6/1982 | Cushing | 392/441 |
| 4,380,091 | A | * | 4/1983 | Lively | 4/508 |
| 4,796,312 | A | * | 1/1989 | Corlew | 4/555 |
| 4,992,942 | A | | 2/1991 | Bauerle et al. | |
| 5,207,956 | A | | 5/1993 | Kline et al. | |

(Continued)

FOREIGN PATENT DOCUMENTS

| | | | |
|---|---|---|---|
| DE | 1815705 B | * | 9/1975 |
| EP | 28067 A1 | * | 5/1981 |

(Continued)

*Primary Examiner* — Crystal J Barnes-Bullock
(74) *Attorney, Agent, or Firm* — J. Douglas Wells; Robert J. Ireland

(57) ABSTRACT

A method of controlling an ebb and flow watering system utilizing existing hardware commonly used in ebb and flow systems including float switches, water pumps, electromechanical timers, reservoir, control bucket, flood lines, indicator LEDs and plant containers such that the filling and draining of the control bucket is improved by accommodating for hydraulic delays, flood line restrictions, and pump limitations, while further providing constant monitoring for leaks or float switch failure, and shutting off the pumps if the same are determined.

12 Claims, 3 Drawing Sheets

(56) References Cited

U.S. PATENT DOCUMENTS

| | | | |
|---|---|---|---|
| 5,285,595 A | 2/1994 | Shirato | |
| 5,287,652 A | 2/1994 | Delp | |
| 5,365,969 A * | 11/1994 | Edwards | 137/387 |
| 5,771,634 A | 6/1998 | Fudger | |
| 5,826,374 A | 10/1998 | Baca | |
| 5,898,375 A * | 4/1999 | Patterson | 340/612 |
| 5,975,102 A * | 11/1999 | Schalk | 137/2 |
| 6,219,966 B1 | 4/2001 | Lapointe et al. | |
| 6,314,676 B1 | 11/2001 | Tucker | |
| 7,611,130 B2 * | 11/2009 | Sylvester | 261/26 |
| 8,007,575 B2 * | 8/2011 | Dobashi | 96/234 |
| 2001/0047617 A1 | 12/2001 | Blossom | |
| 2003/0101645 A1 | 6/2003 | Cole et al. | |
| 2005/0204620 A1 | 9/2005 | Butterfield et al. | |
| 2006/0272210 A1 | 12/2006 | Bissonnette | |
| 2007/0044982 A1 | 3/2007 | Mebane | |
| 2007/0124003 A1 | 5/2007 | Albright et al. | |
| 2008/0120335 A1 | 5/2008 | Dolgoff | |
| 2008/0229661 A1 | 9/2008 | Brooke et al. | |
| 2009/0223128 A1 | 9/2009 | Kuschak | |
| 2009/0265863 A1 * | 10/2009 | Hettinger et al. | 8/158 |

FOREIGN PATENT DOCUMENTS

| | | | |
|---|---|---|---|
| GB | 2058148 A * | 4/1981 | |
| JP | 11009884 A * | 1/1999 | |
| JP | 2000024364 A * | 1/2000 | |

* cited by examiner

COMPUTER IMPLEMENTED METHOD FOR CONTROLLING EBB FLOW WATERING SYSTEMS

TECHNICAL FIELD

This invention relates to the process of controlling the watering of plants, and more specifically, but not by way of limitation, to the computer controlled ebb and flow watering of plants.

BACKGROUND OF THE INVENTION

Growing plants indoors requires the grower to control and manage all facets of the plant growing environment. Historically, a substantial problem in growing plants indoors is keeping a constant human vigilance in maintaining ideal water saturation. The grower must also manage the light exposure, nutrients, and a litany of other complicated balances to enhance plant growth, but the most fundamental element is and always has been water.

The present invention relates to the electronic controller solutions available for growing plants indoors, specifically hydroponic or ebb and flow systems. The ebb and flow watering system as referenced herein, necessarily includes a control bucket, that is in fluid communication with the plant containers at the same elevation, such that the water level in the control bucket, is the same as the water level in the plant containers. Float switches that indicate water level and trigger pump action are also standard, and generally one is located at the bottom of the control bucket to signal empty, and one at the top to signal full. Water pumps that are either on or off move fluid from a reservoir into the control bucket, that then gravity fills the plant containers. An electromechanical timer initiates fill and drain cycles based on user set time periods. Varying methods implemented in the prior art enable these components to work in cooperation, allowing for the timely watering of plants.

For the beginning hydroponic or ebb/flow grower, the management of watering is a first priority, as the absence of soil reduces the margin of error for maintaining adequate moisture but not too much. Ebb and flow gardening requires a controlled regiment cycle of flooding the media which holds the moisture until the next cycle, and then quickly and completely draining the water before unhealthy conditions develop at the plant root system. If the cycles of watering are too far apart, the plants suffer drought conditions, and if the cycles are too close together, over watering can stunt growth or cause disease. Leaving the roots under water or "Root Wet" conditions can also lead to hypoxia in the root cluster, which could lead to fatal plant disease. In short, water management, when growing with an ebb/flow system, is critical for success.

Multi-cycle timers like the described electromechanical short interval timer as shown and described in Flaig U.S. Pat. No. 4,490,051 is a common solution to the watering problem, as the timer turns on and off pumps that facilitate the watering of the plants. The motorized electromechanical timer usually has a dial with a periphery of receiving apertures, and the dial rotates once during a 24 hour period. Depending on user placement of small "tabs" within the periphery apertures of the timer's dial, the timer's rotation toggles (activates and deactivates) an electrical switch within the timer turning electrical components on and off. The tabs may be moved around the dial to accurately set the desired component or watering schedule.

Coupling the electromechanical timer and water pumps with mechanical float switches in a control bucket is a common configuration for ebb and flow gardening. The water gravity feeds from the control bucket to the plant containers along flood lines. The control bucket is at the same elevation and in fluid communication with the plant containers, so the level of water in the control bucket is approximately the same as the level of water in the plant containers. The timer triggers a fill pump to come on, and the fill pump runs until the upper float switch located at the top of the control bucket shuts the pump off when the "Full" level is reached in the control bucket. After the desired time passes per the timer, the timer triggers the drain pump to come on to remove the water from the control bucket and plant containers, pumping the water from the control bucket (and the plant containers) back into the reservoir to be recycled or reused for the next watering cycle. When the lower float switch located at the bottom of the control bucket indicates empty, the mechanical float switch shuts off the drain pump. The above described system provides the basic watering control for the standard ebb and flow systems.

The shortcoming of the timer and float switch combination arises from the hydraulic flow delay between fluid movement between the control bucket and the plant containers or vice versa, as water migration does not occur instantaneously. There may be several flood lines in fluid communication with one control bucket, and each flood line has a plurality of plant containers. Just because the control bucket is "Full" does not mean that all of the plant containers down each flood line are "Full". Gravity fills the plant containers from the control bucket, so the filling of containers is slowed by the limitations of fluid flow at the fittings, grow media, and hose lines. In the common ebb and flow configuration, the control bucket may be at the correct water level when the fill pump shuts off, but as the plant containers finish gravity filling, the level in the control bucket recedes or goes down, leaving the plant containers short on water. Similarly during the drain cycle, the lower float switch may indicate drained, and shut off the drain pump, but water from the flood lines and plant containers are still draining back which results in water standing at undesirable levels in the control bucket and plant containers.

To help illustrate by prior art example, when the electromechanical timer signals 'fill' the fill pump is powered on with the upper float switch connected in series so that when the upper float switch is down the circuit between the electromechanical timer relay and the fill pump is closed. When the upper float switch floats to the full position, the circuit between the electromechanical timer relay is broken, the fill pump is shut off. The problem lies in the water being pumped into the control bucket is entering at a faster rate than the water flowing out of the control bucket down the flood lines and to the plant containers. After the upper float switch indicates 'full' and the fill pump is shut off by the circuit being broke, water continues to recede in the control bucket due to the delay of water flowing down the flood lines, resulting in inadequate levels of water at the plant containers. Due to the hydraulic delay described, when the upper float switch finally drops to a level that signals the fill pump to come back on, the electromechanical timer has timed past the 'fill' cycle, so the fill pump stays off, and the plant containers are not watered adequately.

Other problems with using the prior art float switches that signal 'open' or 'closed' only, is waves or disturbances within the control bucket. If a float switch is set to signal with more accuracy, then it becomes more susceptible to waves in the control bucket which create false 'full' signals which shut the fill pump off, and when the float drops a little as caused by a disturbance, the fill pump is turned back on. This on and off pump cycling is a problem not resolved in the prior art.

The drain cycle is performed much the same way, having the drain pump shut off when the lower float switch drops indicating that the control bucket is adequately drained, opening the circuit thereby shutting off the drain pump. The hydraulic delay of water flowing back through the flood line from the plant containers raises the lower float switch that closes the circuit to the drain pump, causing the drain pump to come back on, only if the electromechanical timer is still in the 'drain' cycle. If the hydraulic delay is such that the 'drain' cycle has ended, the water flowing back is not removed by the drain pump, and an undesirable level of water is left in the plant containers causing a root wet condition. This root wet condition can be detrimental to plant health.

If a less accurate float switch is used that requires considerable change in level before signaling, the fill or drain pump is shut off initially when the desired level is reached, and not turned back on until the level changes considerably, and usually not until after the electromechanical timer has already run through it's 'fill' or 'drain' cycle. Conversely, the more accurate of float switches used, as in the float switch indicates with less change in level, the more susceptible the system is to pulsing the pumps on and off due to waves in the control bucket or under conditions when the hydraulic delays closes match the pump flow. Over cycling the pumps on and off excessively is undesirable, as it causes premature failure of the pump, makes for unnecessary noise, increases power consumption, and decreases the life of the electrical components of the ebb and flow system.

Other problems not addressed in the prior art relate to shutting off the pumps if there is a problem with the system. For example, water leaking from the flood line would cause the upper float to drop, turning on the fill pump, pumping water until the reservoir is empty, or until the timer ends its fill cycle. A reservoir may hold 55 gallons, which if pumped out onto the floor may cause considerable damage. Similarly, a 'run dry' prior art problem occurs when the reservoir gets too low to fill the flood lines, control bucket, and plant containers during the fill cycle. The fill pump is turned on but the control bucket never reaches the desired level, and the upper float switch remains down, keeping the fill pump powered. When the reservoir runs out of water, the fill pump continues to run dry until failure.

Visual indication of fill or drain states have been implemented in prior systems, and are historically accomplished by the use of LEDs that become lit when the corresponding pump is powered. The user can then look and see which pump is running to understand whether the system is filling or draining, but no further indication information is available. Visual indication advances have been implemented in the prior art that requires additional float switches which then turn on and off LEDs depending on water level in the control bucket effectively tied to a particular float switch in the control bucket. However, the addition of float switches increase expense, while decreasing reliability.

SUMMARY OF INVENTION

The controller method described herein was inspired and specifically designed to solve the problems of existing ebb and flow systems described above, while utilizing the same or similar hardware components, thereby allowing a user to upgrade an existing ebb and flow system by installing applicant's controller, without having to replace what they already have installed in their grow space. Of course Applicant's computer controlled method also works well with new components, but has the novel advantage of using proven and readily available components from the prior art, thereby increasing economy, encouraging recycling, with reliable results.

The EBB & FLOW CONTROLLER (EFC) as described herein is a computer that monitors three inputs (two open or closed float switches and an electromechanical timer) and can activate any of four outputs (two indication LEDs, and two water pumps), and is specially designed for accurately controlling the watering of growing plants.

The EFC is supported by readily available components currently utilized in the prior art, specifically in the preferred embodiment, there is an electromechanical timer, relays, AC power cord, two 120VAC electrical outlets that provide power to two pumps, two LEDs, and two float switches that indicate water levels within the control bucket.

The EFC benefits from a custom printed circuit board (PCBA) that includes a microprocessor that monitors the three inputs and controls the four outputs. The microprocessor implements Applicants' method of control via firmware written expressly for the ebb and flow application. The firmware is "State-based" and "Event-driven". It is written in the "C" programming language, which is human-readable. This firmware is architected as a "State Machine" and is always operating in one of several different "States". In operation, "Events" such as a Bottom Switch floating up moves the state machine from one state to the next according to a "State Table" included in the firmware. The firmware includes a State Table Driver subroutine (termed a "function" in the C language). This driver continually monitors the unit's present state and present event. The driver executes its complete function several hundred times each second. The driver locates the present state and present event in the table and obtains from the table what will be the "Next" state. This operation is deterministic, monitors the three inputs, and manages the four outputs accordingly.

BRIEF DESCRIPTION OF DRAWINGS

Elements in the figures have not necessarily been drawn to scale in order to enhance their clarity and improve understanding of these various elements and embodiment of the invention. Furthermore, elements that are known to be common and well understood to those in the industry are not depicted in order to provide a clear understanding of the invention, thus the drawings are generalized diagrammatically in form in the interest of clarity.

DETAILED DESCRIPTION OF DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Figure 1:
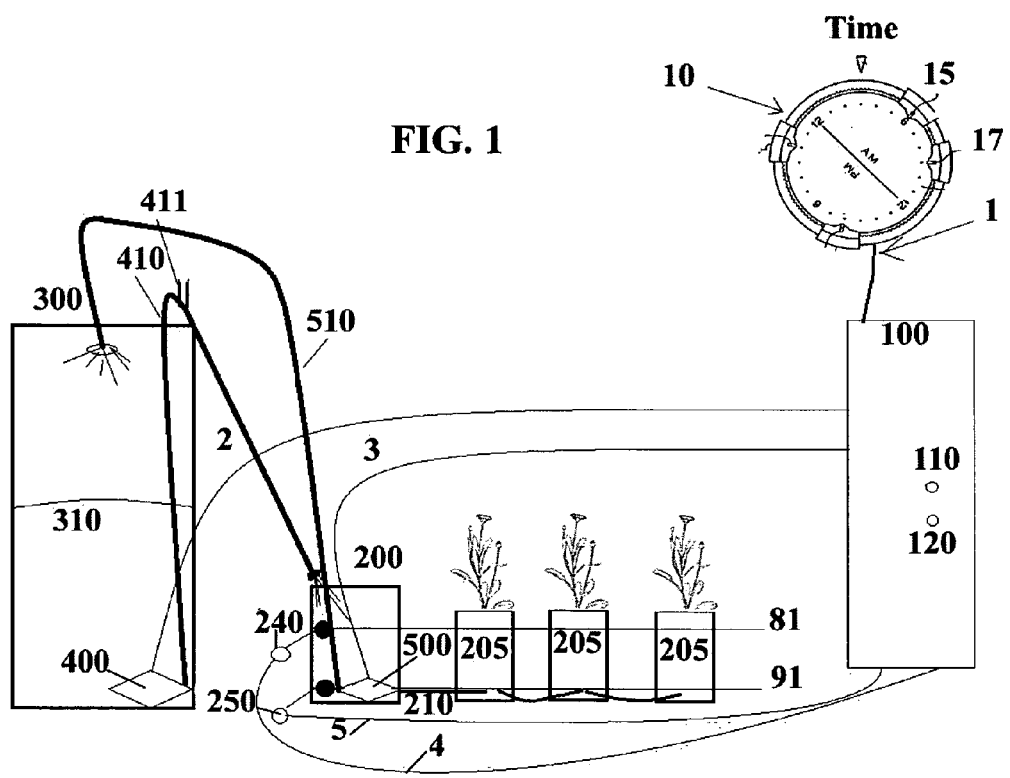
FIG. 1 is a diagrammatic representation of the EFC and method to use in conjunction with an existing ebb and flow system.

As shown in FIG. 1 diagrammatically the prior art ebb and flow configuration of an ebb and flow watering system having a control bucket 200, flood lines 210, plant containers 205, reservoir 300, top switch 240, bottom switch 250, timer 10, and LEDs 110 and 120 for visual indication. There are other configurations of ebb and flow watering systems that Applicants' method could be utilized that employ more than two float switches, however, the preferred embodiment includes only two as it is preferred to limit component count, reduce the number of components that fail, thereby increasing reliability while reducing costs. The preferred embodiment configuration of the components include the "Control Bucket" 200 having a low-voltage float switch "Top Switch"240, located at the desired "fill" level 81 in the "Control Bucket" 200 and a second low-voltage float switch "Bottom Switch" 250, located at the desired 'drained' level 91 in the "Control Bucket" 200. These low-voltage switches provide an open or closed signal, depending on whether they are floated up or down within the "Control Bucket" 200, are relatively inexpensive, and commonly used in the prior art. The EFC 100 is in signal communication with the "Top Switch 240 by fill/output 2 and the "Bottom Switch" 250 by drain/output 3 respectively.

A third EFC 100 input is the timer/output 1 for the EFC includes an electromechanical timer "Timer" 10. The "Timer" 10 benefits from a dial accessible by the User, on the front of the EFC 100 enclosure. The User manipulates small tabs on the dial to establish when the timer will be ON or OFF for the 'fill' 15 cycle, and ON or OFF for the 'drain' 17 cycle during a 24 Hr period.

The EFC 100 controlled outputs include two colored LEDs (red & green) and two standard electrical relays, one for 'fill' and one for 'drain', with each relay conductively connected to provide power to its respective 120VAC electrical outlet, this electrical connection is not shown in FIG. 1 but is well known and understood in the art. A 120VAC "Fill Pump" and a 120VAC "Drain Pump" plug into the corresponding outlets diagrammatically illustrated as fill/output 2 and drain/output 3 respectively.

When the EFC activates a 'drain' or 'fill' relay, the corresponding pump connected to that corresponding AC outlet will be powered on.

The "Control Bucket" 200 is in fluid communication with "Flood Lines" 210, each "Flood Line" having at least one "Plant Container" 205, such that gravity maintains the same level of water in the "Control Bucket" 200 as the plant containers 205, as they are set up at the same elevation. As shown in FIG. 1, the EFC 100 is located away from the "Control Bucket"200 in order to improve illustrative clarity. One skilled in the art will immediately realize that the EFC may be remotely located or instead fixated to the "Control Bucket" 200 and often is to expedite user set up.

The "Control Bucket" 200 is also in fluid communication with the reservoir 300 via the "Fill Line" 410 with the "Fill Pump" 400 submersed in the "Reservoir" 300 such that water pumped by the "Fill Pump" 400 from the "Reservoir" 300 is dropped into the "Control Bucket" 200 from above. The "Drain Line" 510 is in fluid communication with the "Drain Pump" 500 located at the bottom of the "Control Bucket" 200 such that water pumped by the "Drain Pump" 500 is dropped into the top of the "Reservoir" 300. In order to prevent unwanted siphoning from the reservoir 300, an anti-siphon 411 valve is included in the "Fill Line" 410.

As shown in FIG. 1, in one embodiment water pumped by "drain pump" 500 is dropped into reservoir 300 from above the reservoir water level 310.

Figure 2:
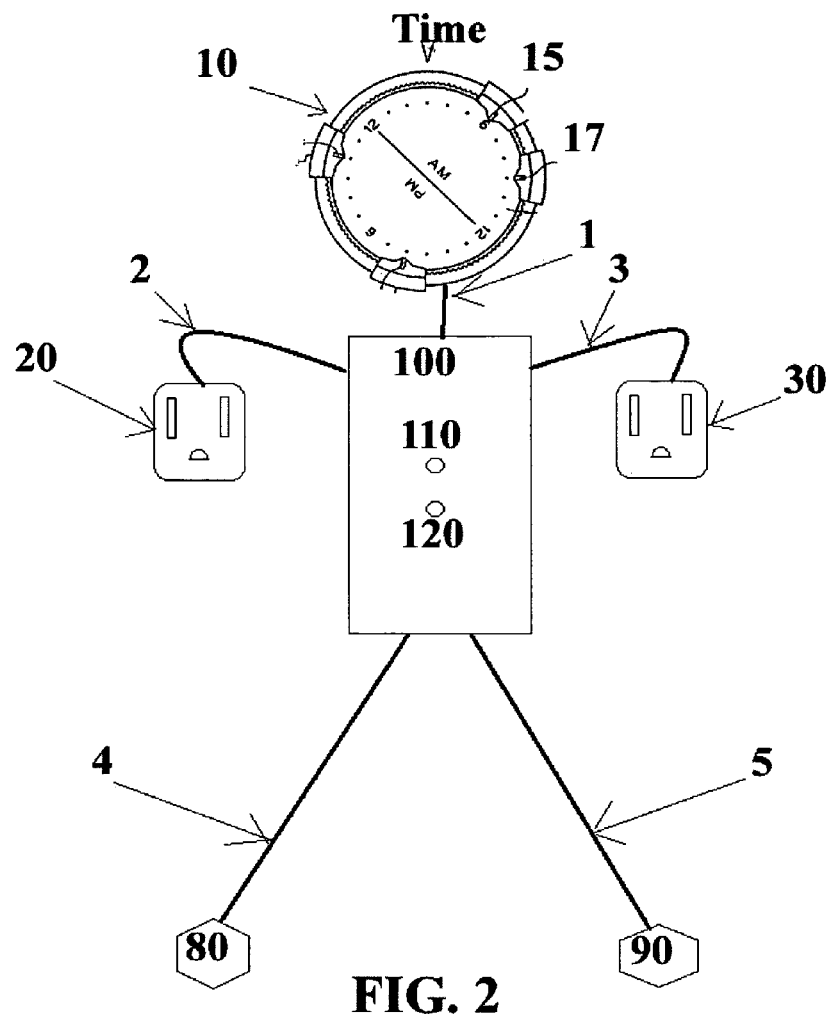
FIG. 2 is a diagrammatic representation of the EFC.

As shown diagrammatically in FIG. 2, the EFC 100 receives input from the timer 10, the top switch 240, and the bottom switch 250. Applicant's method as implemented by the logic based programmed firmware manages the EFC 100, wherein the EFC 100 receives signals as described above and issues commands to the electrical components that turn on and off the fill pump 400 and drain pump 500, while providing indication as to status by illuminating either or both the green LED 110 or red LED 120.

The prior art is replete with timers 10 used in the context shown and described in FIG. 1, wherein the user initiates both 'fill' and 'drain' time periods by setting placement tabs, shown as Start Time Signal 15 and End Time Signal 17. As this form of grower interface using a timer 10 is well known in the industry, the preferred embodiment utilized the same type of electromechanical timer 10, but any timer will work including but not limited to digital or analog timers. The other two inputs, top switch 240 and bottom switch 250 are also common place in prior art as used by the ebb and flow grower but usually are complimented with additional float switches to accomplish the management and visual indication of status of the ebb and flow system. In the prior art the top switch 240 is wired in series with the fill pump 400 which breaks the power to the fill pump 400 upon floating the top switch 240. Similarly, the bottom switch 250 is in series with the drain pump 500, and breaks the power circuit to the drain pump 500 upon the bottom switch 250 dropping. As shown in FIG. 1 and FIG. 2, is a diagrammatic representation of a prior art ebb and flow watering system but with the addition of the inventive method as programmed within the logic based programmed firmware as diagramed in FIG. 3, that manages the EFC 100 as interconnected to the prior art components. The ebb and flow system includes plant containers 205, in fluid communication via at least one flood line 210 with control bucket 200. The control bucket 200 drain level 91 is set by the bottom switch 250 which is located at the desired lower level or 'drained' level within the control bucket 200, and is in signal communication with the computer 100 shown as diagrammatically shown as drain/input 5. The full level 81 is set by the top switch 240 which is located at the desired 'full' level within the control bucket 200, and in signal communication with the EFC 100 as diagrammatically shown as fill/input 4.

As shown in FIG. 1-2, the EFC 100 is in input signal communication with the timer 10 via timer/computer connection 1, the fill switch 80 via fill/input 4, and drain switch 90 via drain/input 5 and in output signal communication with the fill pump 400 via fill/output 2 and drain pump 500 via drain/output 3. The visual LED indicators are depicted as circles, green LED 110 and red LED 120, which are also in output communication with the EFC 100.

Figure 3:
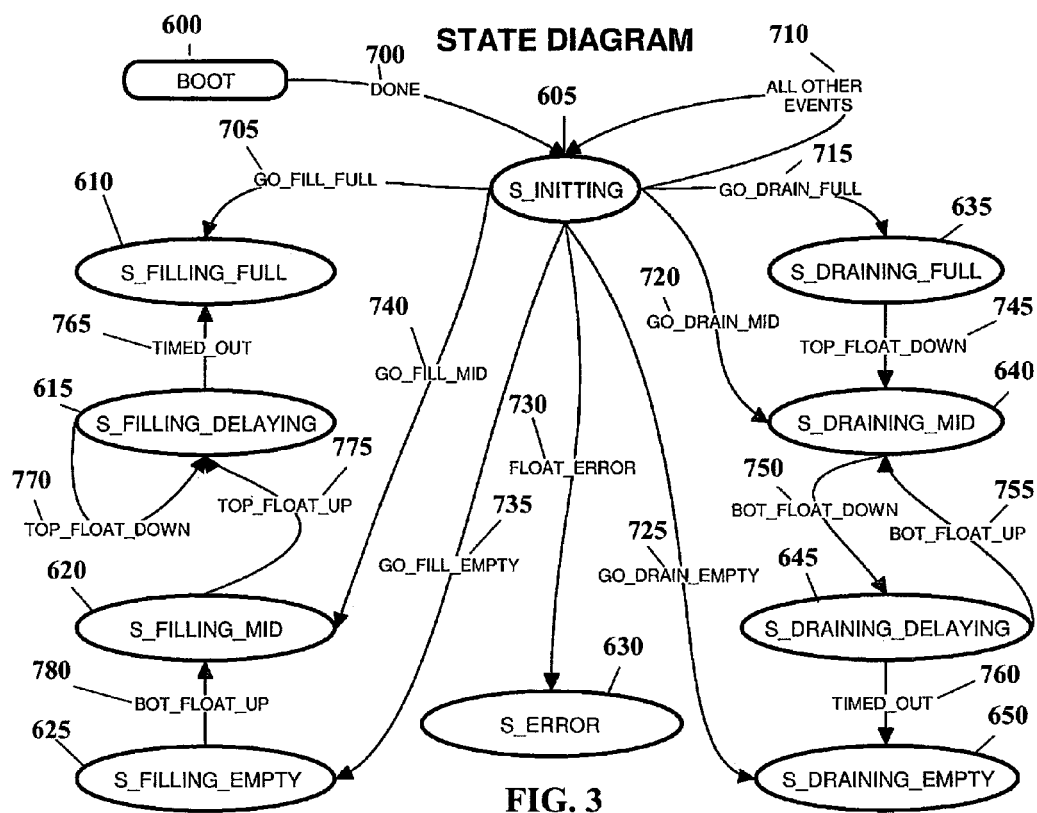
FIG. 3 is a firmware state diagram demonstrating events as occurring and corresponding states as managed by the EFC.

The improvement over the prior art lies within the unique method of managing the pumps with the firmware described herein and shown as a STATE DIAGRAM in FIG. 3, as facilitated by the EFC 100 that receives the prior art inputs (float switch signals), and managing the prior art pumps (drain and fill pumps) to increase reliability and performance of the system, while providing an accurate LED indication of status of the same. Further, the firmware as diagramed in FIG. 3 provides the additional benefit of shutting off the pumps if the float switch inputs indicate error, leak, or failure of a component of the ebb and flow watering system.

The method improves managing of the level of water within the control bucket 200 using only two prior art float switches that signal open in the down position and closed if floated to the up position. To show by an example of a watering cycle, the EFC 100 is signaled by the electromechanical timer 10, and the EFC 100 is initiated to perform a watering cycle, as shown in the state diagram of FIG. 3. The EFC 100 receives input from the top switch 240 and bottom switch 250 indicating the state of water level within the control bucket's 200. A full level 81 is signaled if the top switch 240 is up, and after receiving the full level 81 signal, the EFC 100 initiates an internal timing clock that times out a 'complete fill period' which for the preferred embodiment is approximately five seconds, which works well when there are less that 12 plant containers. During the "complete fill period" the EFC 100 maintains power to the fill pump 400 regardless if the top switch 240 indicates full level 81 at the control bucket 200, and in doing so, waves or disturbances within the control bucket 200 do not turn the fill pump 400 on and off unnecessarily when the desired level is being reached. If the top switch 240 drops while the 'complete fill period' is running, the EFC 100 resets the internal clock and powers the fill pump 400 on for another 'complete fill period', thereby ensuring an accurate and repeatable full level 81 within the control bucket 200. Once the watering 'fill cycle' is timed out by the electromechanical timer 10, AND the internal timer has finished it's 'complete fill period', then the EFC 100 shuts off the fill pump 400 and awaits the next signal.

One example of the preferred embodiment's error management advantage is illustrated by the following events occurring per input states as managed by the firmware of the EFC 100 as illustrated in FIG. 1-2, and charted in FIG. 3. The timer 10 signals start fill time 15 which is received by the EFC 100. The EFC 100 checks the status of the bottom switch 250 and top switch 240 to determine levels of water within the control bucket 200. If the bottom switch 250 is down and the top switch 240 is up, Applicants' method as implemented by the firmware of EFC 100 indicates error, and the EFC 100 shuts down power to both pumps as the bottom switch 250 can't be down if the top switch 240 is up (float switches of the type used in the prior art may stick up or down due to nutrients that fall out of suspension or particulates that come from the plant containers).

If no error (no impossible switch positions), and both bottom switch 250 and top switch 240 are 'down', the EFC 100 initiates the fill pump 400 to fill the control bucket 200 from the reservoir 300 by powering on the fill pump 400 as described earlier. The EFC 100 further provides visual indication while it monitors the switches during the 'fill' cycle by blinking the fill LED 110 slowly upon starting the fill pump 400. Upon the bottom switch 240 floating up, the EFC 100 blinks the fill LED 110 faster. Upon the control bucket 200 reaching the fill level 81, the top switch 250 floats up and signals via fill input 4 to the EFC 100 which then enters into a 'complete fill period' described above, and the EFC 100 turns the fill LED 110 continuously on, and initiates a timer counting from an internal clock of the CPU. Upon the internal clock timing a 'complete fill period' (five seconds for the preferred embodiment without the top switch 240 dropping, but no more than 15 minutes to prevent running the pump dry and to prevent flooding in the event of a leak), the EFC 100 shuts off the fill pump 400 and waits until the next signal from the timer 10. During the 'complete fill period' one skilled in the art will realize the advantages in certain applications where the fill pump 400 may be cycled on and off in order to slowly fill the ebb and flow system to the desired full 81 level without over/under shooting the desired fill level 81, and without over watering the plants, as operating the fill pump 400 has it's advantages in certain application.

To illustrate by another example and to clarify the benefits and advantages of Applicants' inventive method, the preferred embodiment of the 'drain' cycle is herein described. Of note, one of the problems with the prior art ebb and flow systems is that the hydraulic delay of the water draining back from the flood lines and plant containers resulted in undesirable water levels at the control bucket 200 and plant containers 205. During the 'drain' cycle, as triggered by the electromechanical timer 10, which may be a digital or other type of analog timer 10, the EFC 100 checks the position of the top switch 240 and bottom switch 250 as described above for error positions, and if not in error position, then initiates the drain pump 500 located at the bottom of the control bucket 200, and begins slowly blinking the drain LED 120 as water is pumped from the control bucket 200 into the reservoir 300. When the top switch 240 drops the EFC 100 receives that signal 4 and begins blinking the red LED 120 faster while maintaining the drain pump 500 on. Upon receiving signal 5 that the bottom switch 250 has dropped, the EFC 100 powers the drain LED 120 continuous on, initiates a 'complete drain period' which triggers an internal clock within the EFC 100. Upon the internal clock timing a 'complete drain period' (at least 3 seconds for the preferred embodiment while the bottom switch 250 indicates drain level 91) the EFC 100 shuts off the drain pump 500 completely, and waits until the next signal from the timer 10. If during the 'complete drain period' the bottom switch 250 floats up indicating water from the plant containers 205 has drained back into the control bucket 200, the 'complete drain period' time resets, and the internal clock starts over with the resetting of the 'complete drain period' in the EFC 100. The prior art problem of leaving too much water in the plant containers 205 is remedied by Applicants' unique method of keeping the drain pump 500 on for a 'complete drain period' each time the bottom switch 250 drops, and restarts the EFC's 100 internal timing of the "complete drain period" each time the bottom switch 250 floats up during the 'drain' cycle as triggered and timed by the electromechanical timer 10. The 'complete drain period' is easily adjustable by setting in the firmware a longer or shorter 'complete drain period' to accommodate differing hydraulic delays resulting from adding plant containers 205.

To illustrate how the firmware manages the EFC 100 in practice, referring to the preferred embodiment's state diagram shown in FIG. 3, in the S_INITTING 605 state the EFC 100 has the timer 10, the top switch 80, and the bottom switch 90 as monitored inputs, the outputs would include the fill pump outlet 20, drain pump outlet 30, green LED 110, and the red LED 120 shown in FIGS. 1-2. To begin illustrating the preferred embodiment and how the firmware operates the EFC FIG. 3 shows the first event, BOOT 600 which occurs when the power is first turned on. The EFC initializes the hardware, and then posts a DONE 700 event, causing the state machine to enter the S_INITTING 605 state. In the S_INITTING 605 state the firmware examines the conditions of each of the inputs, and depending on the signals from the inputs the firmware causes the EFC to post one of several events. If the top switch 80 and the bottom switch 90 are both down, signaling that the control bucket is empty, and the timer is signaling "Off", then the firmware will post GO_DRAIN_EMPTY 725 and cause the state machine to move to the S_DRAINING_EMPTY 650 state. In the S_DRAINING_EMPTY 650 state both pumps are off, and the red LED 120 is powered continuously on indicating system is drained. If then the timer signals "FILL", then the firmware will post the GO_FILL_EMPTY 735 event code, which causes the state machine to move from the S_DRAINING_EMPTY 650 state to the S_FILLING_EMPTY 625 state.

In the S_FILLING_EMPTY 625 state the Fill Pump is turned on and the control bucket begins to fill, and the green LED 110 blinks slowly. When the bottom switch floats up in the control bucket, the event is labeled in FIG. 3 as a BOT_FLOAT_UP 780 event, the state machine moves to the S_FILLING_MID 620 state leaving the fill pump on, and the green LED 110 blinking faster. When in the S_FILLING_MID 620 state, the state machine looks to see if the upper switch is either TOP_FLOAT_DOWN 770 or TOP_FLOAT_UP 775. If event TOP_FLOAT_DOWN 770, then the fill pump remains on, and the state machine is in the S_FILLING_MID 620 state. If event TOP_FLOAT_UP 775 then the state changes to S_FILLING_DELAYING 615 wherein the fill pump remains on for a predetermined time period, set by the firmware, and timed by the internal clock of the microprocessor, and the green LED 110 is blinked very fast. The desired time to leave the fill pump on after the top switch floats varies in application from one second to several minutes, but in the preferred embodiment, five seconds was determined as an adequate time to top off the control bucket compensating for fluid lag transfer from the control bucket to the flood lines. However, additional time, or custom regulating the fill cycle is application driven, and absolutely accommodated by programming in the firmware of the PCB in the EFC 100. Once the EFC's internal timing clock runs down the desired fill pump delay, the event TIMED_OUT 765 occurs and the state machine goes to S_FILLING_FULL 610 state, which turns the green LED 110 on continuously, and the fill pump is shut off as described in FIG. 3 as the GO_FILL_FULL 705 event.

When the GO_DRAIN_FULL 715 event is triggered by the Timer indicating drain, and the top switch floated up and the bottom switch floated up, the state machine goes into S_DRAINING_FULL 635 state, which initiates the drain pump to turn on, which begins pumping the fluid from the control bucket into the reservoir, slowly blinking the red LED. As the fluid in the control bucket goes down, the top switch drops and the TOP_FLOAT_DOWN 745 event occurs and the state machine goes to S_DRAINING_MID 640 state, which continues to run the drain pump, and blinks the red LED faster. The event BOT_FLOAT_DOWN 750 moves the state machine to S_DRAINING_DELAYING 645 and if the bottom switch floats back up causing the event BOT_FLOAT_UP 755, the state machine goes back to S_DRAINING_MID 640. If the bottom switch is down, the state machine stays in the S_DRAINING_DELAYING 645 state. When in the S_DRAINING_DELAYING 645 state the red LED is blinked very fast, and the firmware cycles the drain pump until the TIMED_OUT 760 event occurs, which transitions the state machine into the S_DRAINING_EMPTY 650 state. In the S_DRAINING_EMPTY 650 state, the red LED is continuously on, and the drain pump is off.

While the present invention has been described in terms of specific embodiment, it is to be understood that the invention is not limited to the embodiments set forth herein. Exemplary embodiments of the fixture and reflector according to the present invention are presented only with those components of primary interest relative to the inventive apparatus and process. For purposes of clarity, many of the mechanical and electrical elements for attaching and assembling the various components of the system are not specifically illustrated in the drawings. These omitted elements may take on any of a number of known forms which may be readily realized by one of normal skill in the art having knowledge of the information concerning the modes of operation of the system and of the various components and related processes utilized for ebb and flow gardening methods including soil and hydroponic.

As shown in FIG. 3, when a FLOAT_ERROR 730 event occurs, the state machine transitions to a S_ERROR 630 state. When a GO_FILL_MID 740 event occurs, the state machine transitions to a S_FILLING_MID 620 state. And when a GO_DRAIN_MID 720 event occurs, the state machine transitions to a S_DRAINING_MID 640 state. When any of ALL OTHER EVENTS 710 occurs, the state machine remains in the S_INITTING 605 state.

The invention claimed is:

1. A computer-controlled ebb and flow watering method utilizing two float switches, two water pumps, a timer, and a control bucket, comprising the steps of:
    initializing fill time period with a timer;
    determining the state of a top float switch and a bottom float switch in a control bucket;
    powering on a fill pump if the top float switch is down;
    starting an internal timing clock if the top float switch is up;
    restarting the internal timing clock if the top float switch drops from up to down;
    shutting off the fill pump if the internal timing clock runs for a complete fill period;
    initializing drain time period after fill time period ends with a timer;
    determining the state of a top float switch and a bottom float switch in a control bucket;
    powering on a drain pump if the bottom float switch is up;
    starting an internal timing clock if the bottom float switch drops from up to down;
    restarting the internal timing clock if the bottom float switch raises from down to up; and
    shutting off the drain pump if the internal timing clock runs for a complete drain period.

2. A method of controlling the fill cycle of an ebb and flow watering system comprising the steps of:
    initializing fill time period;
    determining the state of a switch in a control bucket;
    powering on a fill pump if the switch indicates no liquid at desired fill level;
    starting an internal timing clock if the switch indicates liquid at desired fill level;
    restarting the internal timing clock if the switch indicates no liquid at desired fill level;
    shutting off the fill pump if the internal timing clock runs for a complete fill period.

3. A method of controlling the draining of an ebb and flow watering system comprising the steps of:
    initializing drain time period;
    determining the state of a switch in a control bucket;
    powering on a drain pump if the switch indicates liquid at the switch level;
    starting an internal timing clock if the switch indicates no liquid at desired drain level;
    restarting the internal timing clock if the switch indicates liquid at desired drain level;
    shutting off the drain pump if the internal timing clock runs for a complete drain period.

4. A method of controlling an ebb and flow watering system of claim 1 or 2 wherein the complete fill period is no greater than the hydraulic delays of filling the ebb and flow watering system.

5. A method of controlling an ebb and flow watering system of claim 1 or 2, wherein the complete fill period is less than fifteen minutes.

6. A method of controlling an ebb and flow watering system of claim 1 or 2 further comprising the steps of blinking a fill LED when the fill time period is running or the internal timing clock is running, so long as the fill pump is powered on.

7. A method of controlling an ebb and flow watering system of claim 1 or 2 further comprising the steps of powering continuously on a fill LED when the fill time period is running and the fill pump is off.

8. A method of controlling an ebb and flow watering system of claim 1 or 3, wherein the complete drain period is no greater than the hydraulic delays of draining the ebb and flow watering system.

9. A method of controlling an ebb and flow watering system of claim 1 or 3 wherein the complete drain period is no less than 3 seconds.

10. A method of controlling an ebb and flow watering system of claim 1 or 3 further comprising the steps of blinking a red LED when the drain time period is running, or the timing clock is running, so long as the drain pump is powered on.

11. A method of controlling an ebb and flow watering system of claim 1 or 3 further comprising the steps of powering continuously 'on' a LED when the drain time period is running and the drain pump is off.

12. A method of controlling an ebb and flow watering system of claim 1 further comprising the steps of initializing an error state if any of the following events occur:
- the top float switch is up while the bottom float switch is down;
- the internal timing clock is still running when the fill time period ends; or
- the internal timing clock is still running when the drain time period ends.

* * * * *